Nov. 14, 1967   G. B. POWELL   3,352,387
SHOCK ABSORBER FLUID FLOW VELOCITY REDUCING MEANS
Filed July 30, 1965   3 Sheets-Sheet 1

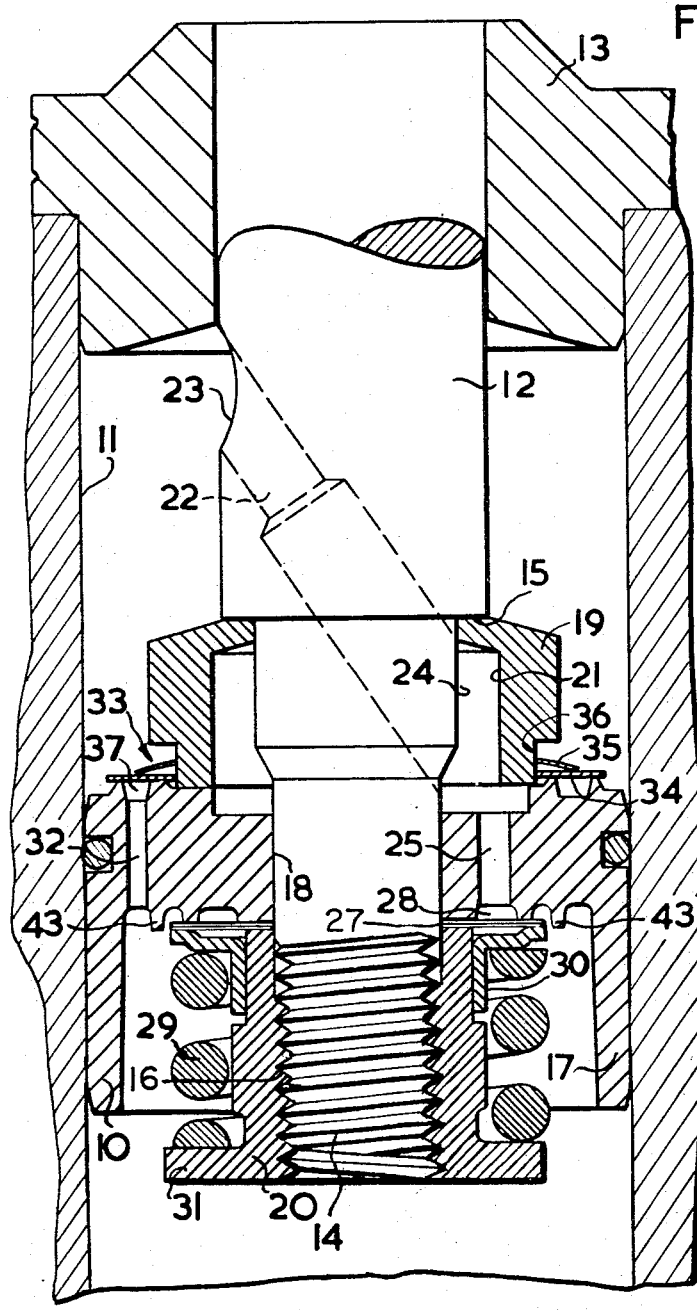

United States Patent Office

3,352,387
Patented Nov. 14, 1967

---

3,352,387
SHOCK ABSORBER FLUID FLOW VELOCITY REDUCING MEANS
George Bertram Powell, Solihull, England, assignor to Girling Limited, Birmingham, England, a British company
Filed July 30, 1965, Ser. No. 476,043
2 Claims. (Cl. 188—96)

This application is a continuation-in-part of application Serial No. 233,767 filed October 29, 1962, and now Patent No. 3,204,728.

This invention relates to hydraulic dampers or shock absorbers including a piston and cylinder assembly.

Difficulty is experienced in reducing the piston speed as it approaches an end of the cylinder during reciprocable motion therein, whilst providing dampened flow of hydraulic medium from one side to the other of the piston during the remainder of the piston movement. One previous proposal, in a telescopic damper comprising a piston slidably fitted within the cylinder and a piston rod of small diameter slidably received in a sealing gland for the end of the cylinder, utilised an L-shaped transfer passage in the piston rod, the downstream end of the passage in the direction of dampened flow including a one-way poppet valve, the upstream end of the passage extending to the rod periphery between the gland and the piston so that hydraulic fluid could pass through the passage until the gland was reached towards the extremity of the piston stroke, the hydraulic fluid thereafter trapped between the gland and piston then acting as an "hydraulic stop."

The above arrangement, though having a number of practical advantages, also has a number of serious disadvantages. The angled liquid transfer passage is difficult to clean of swarf before assembly and requires close, accurate machining. The poppet valve requires a small diameter spring of consequent high rate, so that the valve is very sensitive to variations in tolerance, and since such valves usually require a number of components each valve has to be individually manually flow set.

The above arrangement is also found to be noisy in operation.

It is an object of the present invention to provide a damper incorporating an hydraulic stop together with a valve adapted for automatic setting.

According to the invention an hydraulic damper or shock absorber comprises a piston carried on a piston rod acting in a cylinder and having a transfer passage or transfer passages incorporating an hydraulic stop, wherein the downstream end of the or each transfer passage in the direction of dampened flow is controlled by a one-way valve having a closure member in the form of a flexing shim. The flexing shim is less noisy, cheaper and more adapted to consistent settings than the poppet type valve previously used. In practice one portion of the shim is clamped while the other, which is free to flex, covers the downstream end of the transfer passage. In contrast to the poppet type valve, this has the advantage of providing only a single flow path for the liquid. Furthermore, the spring-loading required for the shim valve is approximately only half that for the poppet type valve.

The transfer passage instead of being L-shaped, is straight and extends across the piston rod obliquely to the axis thereof.

One embodiment of the invention will now be described by way of example with reference to the accompanying drawings, in which:

FIGURE 3 is a sectional view similar to FIGURE 1 showing a modification of the piston adjacent to the valve.

Similar parts in both views will be indicated by the same reference numerals.

Figure 1:
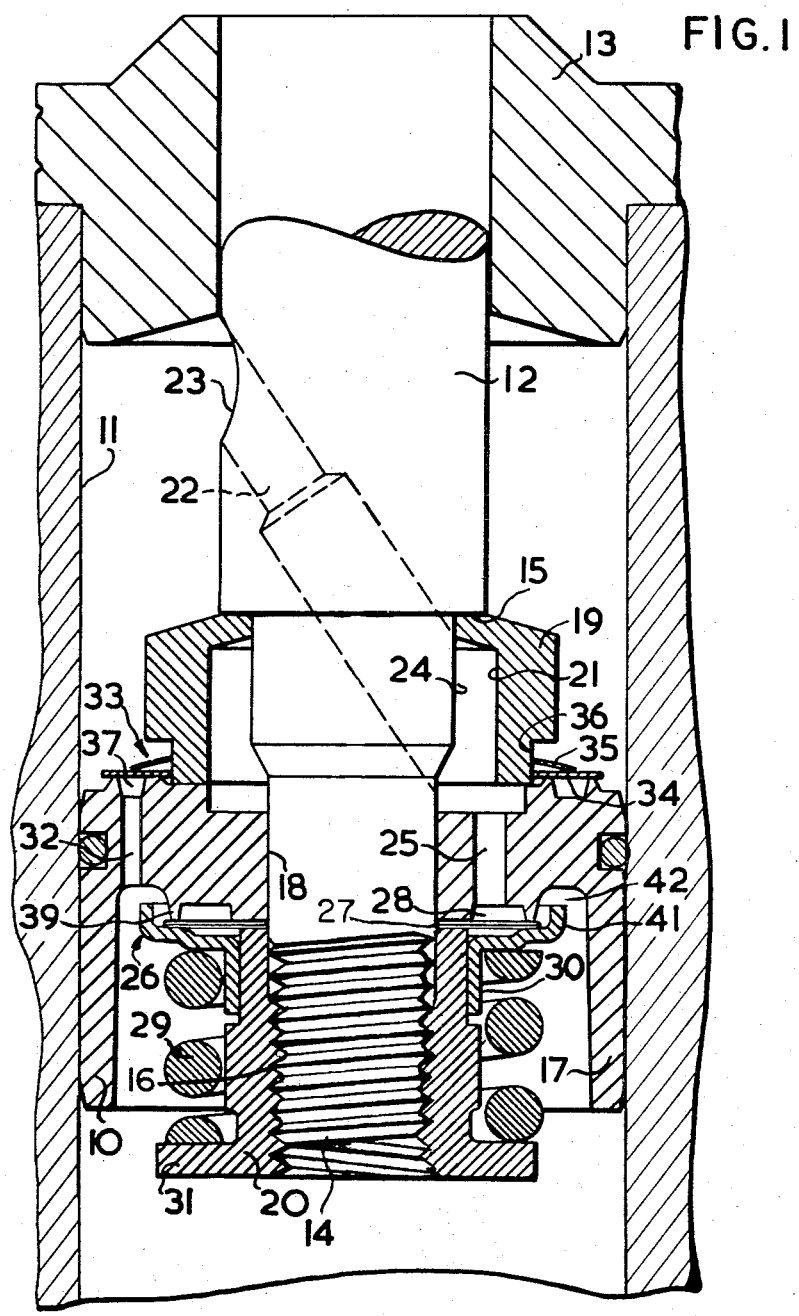
FIGURE 1 is a sectional view of a piston and cylinder assembly according to the invention, forming part of a telescopic hydraulic damper.

In both embodiments a piston assembly 10 is slidably mounted in an hydraulic cylinder 11 and carried on a piston rod 12. The piston rod 12 extends from the cylinder through a gland 13 and is of reduced diameter over a substantial length 14 to provide a shoulder 15, the extreme end of the reduced portion being formed with a screw thread 16. The piston has a skirt 17 and a central bore 18 which is a close fit on the reduced portion 14 of the rod. The piston is fixed on the rod between a collar 19 which abuts the shoulder 15 and a flanged sleeve nut 20 which engages the thread 16 on the end of the rod. In an alternative construction the nut 20 and the rod-end 14 may be unthreaded and the nut secured to the rod by, for example, welding. Adjacent the crown of the piston the bore of the collar 19 is enlarged to form a substantially annular gallery 21.

In the embodiment shown in FIGURE 1 an oblique passage 22 extends through the rod 12 and one end of this passage opens on the surface of the piston rod between the piston 10 and the gland 13 as at 23 while the other end opens into the gallery 21 as at 24. The gallery 21 is in communication with a number of short narrow passages 25 which extend axially through the crown of the piston. The ends of the passages 25 remote from the gallery open into an annular groove 28 which is closed by a one-way valve generally indicated at 26, the valve being in the form of two shims or sheet metal rings 27, of equal size, the inner edges of which are clamped between the piston and the sleeve nut. The outer edges of the shims, which are able to flex towards and away from the piston, are normally held against the piston by the force of a helical spring 29 acting through an L-section thrust washer 30, the other end of the spring 29 being retained by a flange 31 of the sleeve nut 20.

In operation, as the piston 10 moves towards the gland 13 hydraulic fluid is transferred from one end of the cylinder to the other through the shim valve 26. This transfer of fluid is reduced and may eventually be stopped as the upstream end 23 of the oblique passage 22 passes into the gland 13.

A second series of axial passages 32 through the crown of the piston allow the transfer of fluid in the reverse direction. These passages 32 are disposed radially outwards of the passages 25 and open into an annular groove 37 in the upper face of the piston, this groove being closed by a one-way valve shown at 33. This valve is in the form of a sheet metal ring 34 which is located together with a spring washer 35 on a reduced section 36 of the outside diameter of the collar 19.

When the piston is moving towards the gland 13 liquid is displaced from the space in the cylinder above the piston through the passage 22 in the piston-rod into the gallery 21 and through the passages 25 in the piston. The pressure of the liquid acting on the upper surfaces of the shims 27 moves their outer edges away from an annular seating 39 on the piston against the action of the spring 29 acting through the thrust washer 30, and the velocity of the liquid as it flows through and on from the valve is reduced to eliminate or reduce noise produced by high speed flow of liquid through orifices of small area.

In the arrangemetn shown in FIGURE 1 the washer 30 is formed with a peripheral axially extending flange 41 spaced radially from the seating 39 and having its free edge spaced axially from the upper surface of an annularr ecess 42 in the piston around the seating. Thus liquid displaced from the space above the piston flows axially through the passages 25 and then radially between the shims and the seating 39. It is then deflected upwardly by the flange 41 and outwardly between the upper edge of the flange and the recess 42 before passing downwardly again into the large volume space within the piston skirt in which the spring 29 is housed. These changes of direction in conjunction with the increased area for the flow of the liquid reduce its velocity to a very substantial extent.

In the alternative construction shown in FIGURE 3 the flange 41 on the washer 30 is replaced by an annular flange 43 on the piston which provides an equivalent flow path for the liquid after passing through the valve.

Figure 2:
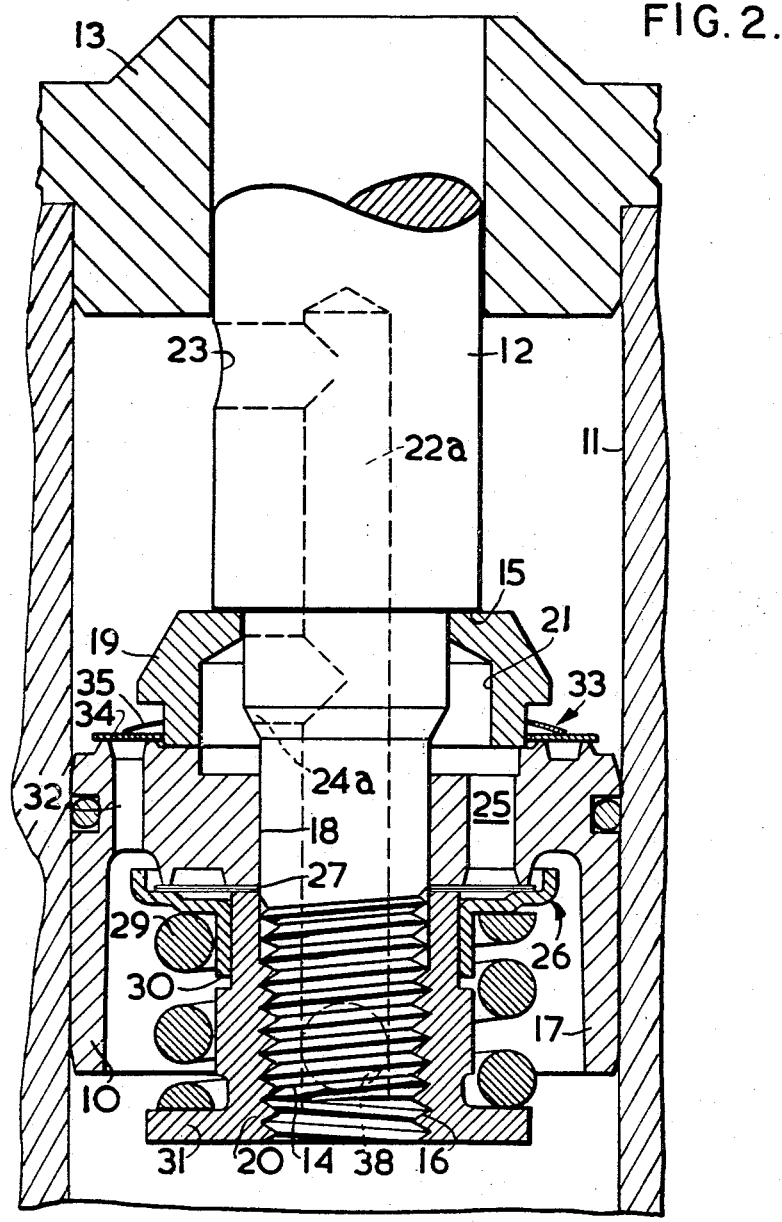
FIGURE 2 is a sectional view similar to FIGURE 1 of an alternative form of piston and cylinder assembly for a telescopic hydraulic damper.

The piston and rod assembly shown in FIGURE 2 is similar in operation to that shown in FIGURE 1 but differs slightly in construction. The passage through the piston rod shown at 22 in FIGURE 1 need not be oblique although this is the preferred form. In the form shown in FIGURE 2 an L-shaped passage is provided by making an axial drilling 22a and a radial drilling 23a in the rod 12, further radial drillings 24a being made to permit communication between the axial drilling 22a and the gallery 21 when the collar 19 is assembled on the rod. The open end of the drilling 22a is permanently closed as by a ball 38.

Assuming the pressure-affected area of the piston to be 100% then the corresponding area of the inner passages shoulde be between 0% and 5%, whilst the corresponding area of the outer passages should be between 5% and 20%, the preferred figures being 3% and 10% respectively.

These ranges represent the free flow conditions through the valves which are best for effective operation.

The shim valve may comprise more than two shims.

The cylinder and piston assembly is associated in the usual way with a reservoir which keeps the cylinder full of liquid.

I claim:

1. An hydraulic damper comprising a cylinder, a piston slidable in said cylinder and dividing it into first and second spaces, a piston rod axially attached to said piston, an end wall on said cylinder closing said first space, a gland in said end wall, said piston rod extending through said first space and being slidable through said gland, an annular chamber in the piston, a passage in the piston rod connecting said chamber with said first space in the cylinder, a one-way valve allowing flow of liquid under pressure from said annular chamber to said second space and comprising at least one annular ring-shaped shim cooperating with a seating in said piston, means for rigidly holding the inner edge of said shim against an abutment on the piston, resilient means comprising a spring and a thrust washer engaged by the spring and urging said shim into engagement with the seating, and an annular flange on said washer surrounding and spaced radially from the periphery of said shim and extending axially towards the piston whereby on movement of the outer edge of the shim away from the seating liquid passing through the valve is caused to flow radially between the shim and the seating and is then deflected axially by said flange and its veloctiy of flow is reduced.

2. An hydraulic damper as set forth in claim 1 further including an annular recess in the piston around the seating, said axially extending portion of the washer extending into said recess.

References Cited
UNITED STATES PATENTS

| | | | |
|---|---|---|---|
| 1,928,633 | 10/1933 | Rockwell. | |
| 1,983,064 | 12/1934 | Bates. | |
| 2,320,697 | 6/1943 | Binder | 188—88 |
| 2,410,539 | 11/1946 | Whisler | 188—88 |
| 2,551,749 | 5/1951 | Lewton | 188—88 |
| 2,702,099 | 2/1955 | Lautz | 188—88 |
| 3,204,728 | 9/1965 | Powell | 188—88 |

FERGUS S. MIDDLETON, *Primary Examiner.*

G. E. HALVOSA, *Assistant Examiner.*